United States Patent [19]

Malacheski et al.

[11] 4,077,544
[45] Mar. 7, 1978

[54] FLUID TRANSFER DEVICE

[75] Inventors: Joseph J. Malacheski; Richard J. Zenda, both of Wilkes-Barre, Pa.

[73] Assignee: Donald Gutkowski, Ashley, Pa.; a part interest

[21] Appl. No.: 714,798

[22] Filed: Aug. 16, 1976

[51] Int. Cl.² .............................................. B67D 5/06
[52] U.S. Cl. ..................................... 222/95; 222/105; 222/184; 222/340; 222/386.5; 222/482; 141/27; 141/98
[58] Field of Search .............. 222/340, 95, 105, 386.5, 222/482, 488–489, 184; 141/25–27, 98

[56] References Cited
U.S. PATENT DOCUMENTS

| 354,571 | 12/1886 | Norton | 222/489 X |
|---|---|---|---|
| 1,689,186 | 10/1928 | Zabriskie | 222/340 X |
| 1,957,545 | 5/1934 | Krueger et al. | 222/340 X |
| 1,971,450 | 8/1934 | Heitmuller et al. | 222/340 |
| 1,996,792 | 4/1935 | Bystricky et al. | 222/95 |
| 2,625,016 | 1/1953 | St. Clair | 222/482 X |
| 2,744,662 | 5/1956 | Smith et al. | 222/386.5 X |
| 3,951,310 | 4/1976 | Steiman | 222/340 X |

Primary Examiner—Robert B. Reeves
Assistant Examiner—Charles A. Marmor
Attorney, Agent, or Firm—Robert K. Youtie

[57] ABSTRACT

A fluid transfer device including a casing having a fluid port, a flexible wall container in the casing and communicating exteriorly thereof through the fluid port, a resiliently biased plunger in the casing urged toward the container for collapsing the latter and expelling fluid through the port, and valved discharge means for selectively controlling fluid discharge through the port.

10 Claims, 5 Drawing Figures

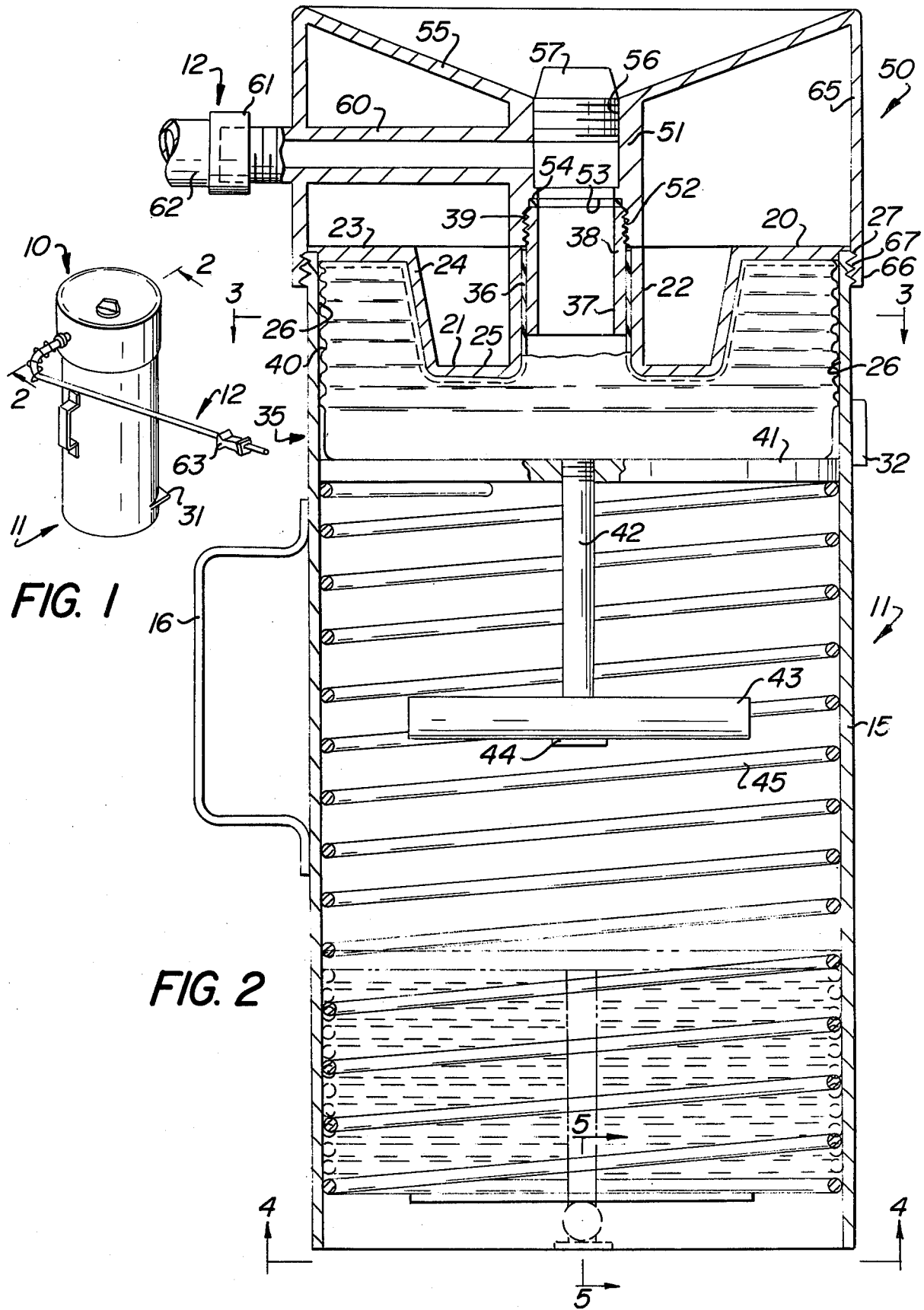

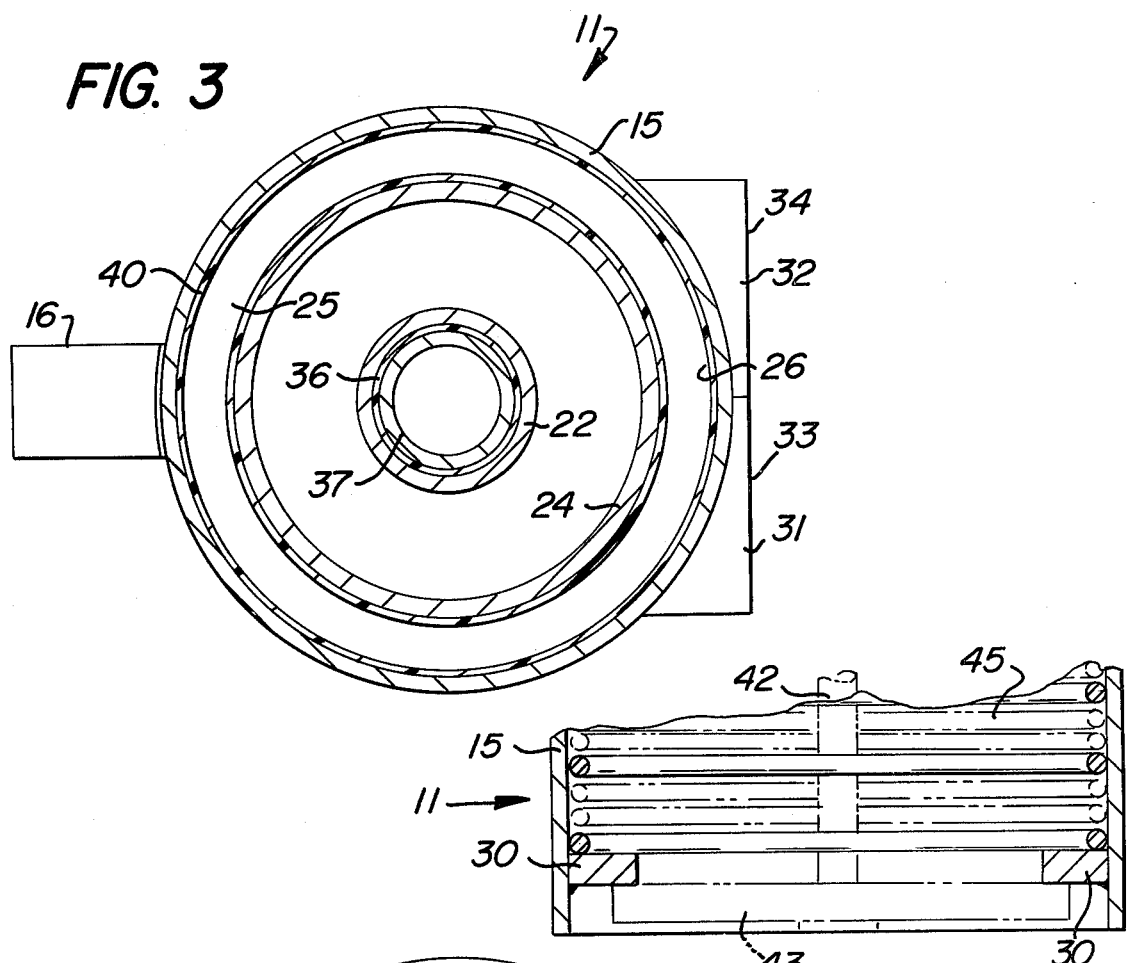
FIG. 3
FIG. 5
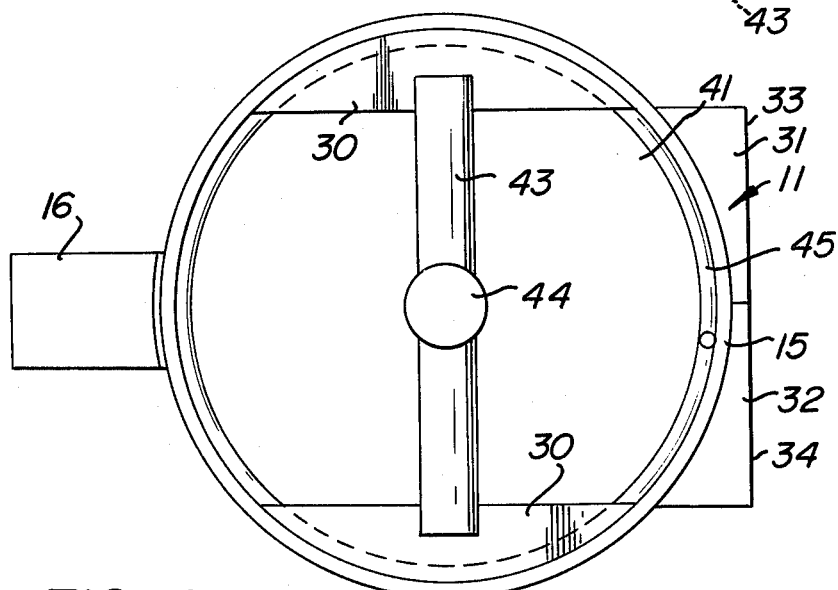
FIG. 4

FLUID TRANSFER DEVICE

BACKGROUND OF THE INVENTION

While there have, in the prior art, been provided a variety of fluid transfer devices of the general type described above, such devices have been relatively complex and expensive to manufacture, difficult to operate, and lacking in reliability, so as not to have acquired wide general acceptance.

SUMMARY OF THE INVENTION

It is, therefore, an important object of the present invention to provide a fluid transfer device of the type described which is relatively simple in construction for economy in manufacture and sale at a reasonable price, durable and reliable throughout a long useful life, and which greatly simplifies operation both in loading or filling of the device, and transfer and discharge of the fluid contents.

It is still another object of the present invention to provide a fluid transfer device having the advantageous characteristics mentioned in the preceding paragraph which is capable of advantageous utilization in many diverse applications, all of which are intended to be comprehended herein.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

BRIEF DESCRIPTION OF THE DRAWINGS

FIG. 1 is a top perspective view showing a fluid transfer device constructed in accordance with the teachings of the present invention.

FIG. 2 is a sectional elevational view taken generally along the line 2—2 of FIG. 1.

FIG. 3 is a horizontal sectional view taken generally along the line 3—3 of FIG. 2.

FIG. 4 is a bottom view taken generally along the line 4—4 of FIG. 2.

FIG. 5 is a partial sectional elevational view taken generally along the line 5—5 of FIG. 2.

DESCRIPTION OF THE PREFERRED EMBODIMENT

Referring now more particularly to the drawings, and specifically to FIG. 1 thereof, a fluid transfer device is there generally designated 10, including generally a housing or casing 11 for containing a fluid being transferred, and valved discharge means, generally designated 12, for selectively discharging fluid from the casing.

The casing may include a peripheral side wall 15, being illustrated as generally cylindrical and elongate in its axial direction. The casing side wall may be provided on one side with a longitudinally extending handle, loop or handgrip 16. If desired, the cylindrical casing wall 15 may be fabricated of transparent material, as for visual observation of the quantity of contents, as will appear more fully hereinafter.

The cylindrical peripheral side wall 15 has one end closed, its normally upper end closed, as by an end wall 20. The end wall 20 may extend entirely across the upper end of side wall 15, being suitably secured thereto by any desired means. The configuration of the end wall 20 may include a centrally located depressed portion 21, being externally recessed and defining an internal protrusion within the casing side wall 15. Generally axially of the cylindrical side wall 15, centrally of the recess 21, the end wall 20 is provided with an outwardly projecting tubular portion or nipple 22.

More specifically, the end wall 20 may include a generally annular, substantially flat or planar wall portion 23 extending about the upper end of side wall 15 and projecting radially inwardly therefrom. Depending from the inner edge of annular end wall portion 23 is a generally conical or convergent annular side wall 24 which terminates at its lower end in a generally flat, annular bottom wall 25. Thus, the inner side wall 24, bottom wall 25 and nipple 22 combine to define the central internal protrusion or external recess 21 of the end wall 20. Surrounding the recess side wall 24, between the latter and the adjacent portion of casing side wall 15, and closed at its upper end by annular wall portion 23, is a generally annular, downwardly facing internal pocket 26 of the casing 11. Exteriorly on the casing side wall 15 adjacent to the upper end thereof may be provided fastening means, such as screw threads 27.

The other, lower end of casing side wall 15 is generally open, and may be provided at diametrically opposed locations with a pair of internal projections 30, say in the configuration of chordal sectors as seen in FIG. 4, serving as holding means, as will appear presently. Exteriorly the casing side wall 15 may be provided adjacent to opposite ends with a pair of generally triangular or wedge shaped external appendages 31 and 32 which combine to define a plane surface for nonrolling resting engagement with a ground or suitable support. The generally triangular stabilizing wedges 31 and 32 may be spaced from each other longitudinally of the cylindrical casing side wall 15, as seen from FIGS. 1 and 2, and angularly offset about the axis of side wall 11 as seen from FIGS. 3 and 4, with generally coplanar approximately tangential edges 33 and 34 defining a plane of supporting surface engagement.

Internally of the casing 11 is a flexible walled container, bag or bladder 35 adjacent to the container end wall 20. The flexible bladder 35 is expandable and collapsible within the casing 11, and includes at one end adjacent to the wall 20 an open neck or fluid port 36 which extends into and substantially through the nipple or tube 22 of the end wall. A tubular, open ended port member or insert 37 may be partially engaged into the end wall tube 22, within the container neck 36, as by a snug fit therein, including an outer end portion 38 projecting beyond the end wall tube 22 and provided externally with fastener means or screw threads 39. In this manner, the flexible walled container or bag 35 may be anchored within the casing 11 to the casing end wall 20.

The bladder or container 35 is shown in solid lines in FIG. 2 as partially collapsed toward the container end wall 20, the container side wall 40 being accordian-like, folded, pleated or gathered generally into the annular pocket 26. As will appear more fully hereinafter, the container 25 is substantially completely collapsible toward the bottom wall 25 of the end wall 20 and expansible away from the end wall toward the opposite end of the casing side wall 15.

Shiftably disposed within the casing side wall 15, between the flexible walled container 35 and lower open end of the container side wall is a generally disc-like plunger or piston 41. The piston is provided on its outer side, toward the lower open end of the casing side wall 15 with an outstanding projection or rod 42, which may extend generally coaxially within the casing. A transverse handgrip, handle or crosspiece 43 may be rotatably carried by the rod or stem 42, the crosspiece extending generally diametrically of the casing side wall 15; and, a retaining head or enlargement 44 provided on the lower outer, free end of the rod or stem 42 permitting rotational movement of the crosspiece or handle 43 about the axis of stem 42 and retaining the handpiece on the stem. The length of the handpiece 43 is less than the internal diameter of the casing side wall 17 and greater than the distance or spacing between the internal projections or holding members 30. Therefore, the plunger handpiece 43 may be withdrawn toward the open end of the casing side wall 15 through and beyond the space between holding members 30 by disposition generally parallel to the holding members. However, upon rotation approximately 90° to a disposition normal to the holding members, the handpiece is abuttingly engageable at its opposite end portions with the holding members and retained by the latter outwardly against inward return into the casing side wall. This latter condition is shown in FIG. 4.

Disposed generally coaxially within the casing side wall 15, and interposed in bearing engagement between the plunger or piston 41 and inner sides of the holding members 30 is a coil compression spring 45. The coil compression spring is of an internal diameter sufficiently large to permit unobstructed movement there through of the handle 43 and has its opposite ends in bearing engagement with the piston 41 and holding members 30, so as to at all times resiliently urge the piston toward the casing end wall 20. It will therefore be understood that the spring 45 provides resilient biasing means in its relatively compressed condition, shown in phantom in FIG. 2, to urge the piston toward end wall 20, and also affords resilient biasing means urging the piston into a limiting position with the collapsible bladder 35 completely compressed against the bottom wall 25 of the internal protrusion 21.

The valved discharge means 12 may include an end fitting generally designated 50 engaged over the casing end wall 20. In particular, the fitting 50 may include a tubular open ended connector 51 which may have internal threads 52 for threaded engagement with the external threads 39 of the insert 38. The tubular connector 51 may be provided with an inwardly facing, internal annular shoulder 53 for location in facing relation with the outer end surface of nipple 38, and an annular gasket or sealing ring 54 may be interposed in sealing compressed relation between the shoulder 53 and end surface of insert 38.

The outer end of the tubular connector 51 is provided with an outwardly flaring generally conical wall section 55, which cooperates with the tubular connector 51 to define a funnel, as will appear hereinafter. The outer end of the tubular connector 51, adjacent to the flaring section or funnel 55 may be provided with internal screw threads 56, and a removable closure or plug 57 may be threadedly engaged in the outer end of tube 51 to openably close the latter.

Extending generally radially outwardly from an intermediate region of connector tube 51, and communicating with the interior thereof, is an outlet tube 60. The outlet tube 60 may extend radially beyond the casing side wall 15, there being connected, as by detachable connector means 61, to a flexible discharge conduit 62. The flexible discharge conduit or hose 62 may carry a releasable squeeze-type valve 63, or other suitable valve means may be provided for opening and closing the discharge conduit.

Depending peripherally about the outer edge of flaring section or funnel 55 is a generally cylindrical wall or skirt 65 which has its lower marginal portion 66 closely circumposed about the upper region of casing side wall 15 and provided with internal screw threads 67 in threaded engagement with the external screw threads 27 of the casing side wall. Thus, the peripheral wall or skirt 65 effectively encloses the region between funnel 55 and casing 11, and the outlet tube 60 may project directly through the skirt, as best seen in FIG. 2. As best seen therein, the connector 51, outlet tube 60, funnel 55 and skirt 65 may all be integrally fabricated, or may be separately fabricated and secured together, if desired.

In operation, the funnel 55 may be opened by removal of plug 57 and plunger 41 withdrawn downwardly to its phantom position shown in FIG. 2. It will there be apparent that resilient spring means 45 is substantially compressed between the plunger and holding means 30, the handle 43 being rotated to position generally normal with respect to the chordal holding means 30 and in bearing engagement therewith to retain the plunger retracted. The flexible container or bag 35 is opened or expanded and, liquid to be transferred may be quickly and easily introduced through the funnel 55, connector 51 and port 38 into the expanded container or bladder. When the bladder is filled to the extent desired, the plug or closure 57 may be replaced in the connector 51, the valve 63 being closed, and the handgrip 43 rotated about 90° and released for movement of the plunger into pressurizing engagement with the bladder under the force of resilient means 45. The transfer device 10 may then be readily transported by manual grasping of the handle 16 and stationarily positioned at rest in the vertical position illustrated in FIG. 1, or horizontally on the support edges 33 and 34 of external appendages 31 and 32.

For discharging the fluid contents, it is only necessary to aim the free end of flexible conduit or hose 62 as desired, and open squeeze closure or valve 63, whereupon plunger 42 under the force of spring 45 will exert pressure on the bladder 35 to collapse the latter and expel its fluid contents through the port 38, connector 51, outlet tube 60 and discharge conduit 62. Of course, cessation of flow may be achieved by mere closure of valve 63. Upon complete expulsion of the fluid contents of bladder 35, the bladder is squeezed substantially flat between the plunger 41 and the bottom wall 25 of protrusion 21, while additional material of the bladder is gathered in the annular pocket defined between walls 23, 24 and 15.

The fluid transfer device is then ready for refilling as described hereinbefore. However, filling may be achieved otherwise as the flexible walled container or bladder 35 is preferably suitably secured to the plunger 41, the bladder thereby being expanded upon retraction of the plunger to the phantom position shown in FIG. 2. By such retraction, suction is applied through flexible hose 62, and the free end thereof may be emersed in fluid for siphoning or drawing fluid contents into the bladder.

From the foregoing it will be appreciated that a simple and reliable fluid transfer device is provided which is capable of many varied applications, including plant watering, radiator filling, window washing, oil removal and replacement, fire extinguishing, and many other functions, and otherwise fully accomplishes its intended objects.

Although the present invention has been described in some detail by way of illustration and example for purposes of clarity of understanding, it is understood that certain changes and modifications may be made within the spirit of the invention.

What is claimed is:

1. A fluid transfer device comprising an elongate casing, one end wall at one end of said casing, the other end of said casing being sufficiently open to receive a user's hand and configured to define a ground engageable plane for stably supporting said casing in upright relation, a fluid port in said one end wall, an expansile and collapsile container having a fluid port and located within said casing and having its fluid port secured in communication with the casing fluid port, said container being expansile away from said one end wall to receive fluid through said ports and collapsile toward said one wall to expel fluid through said ports, a plunger shiftable in said casing between extreme positions toward and away from said one end wall to enable expansion and effect collapse of said container, resilient means urging said plunger toward said one wall, said plunger and resilient means being entirely within said casing in said extreme positions, outwardly flaring filling means connected in fluid communication with said ports and facing upwardly when said casing is supported in its upward relation for collecting and guiding fluid to said container, closure means for said filling means, and valved discharge means connected to said ports between the latter and said filling means for selectively discharging fluid from said container under the force of said resilient means.

2. A fluid transfer device according to claim 1, a central protrusion on said one end wall protruding into said casing and defining thereabout a peripheral pocket communicating with the interior of said casing, said container comprising a flexible walled bladder collapsible between said plunger and said one end wall with opposite bladder wall portions squeezed between said protrusion and plunger and intermediate bladder wall portions gathered into said pocket.

3. A fluid transfer device according to claim 2, said one end wall having an external central recess defining said protrusion, and said plunger comprising a piston.

4. A fluid transfer device according to claim 3, said resilient means comprising a coil compression spring.

5. A fluid transfer device according to claim 4, in combination with handgrip means on said piston manually accessible through said other end of said casing for withdrawing said piston outwardly, and holding means on said casing for releasably holding said piston in its withdrawn position.

6. A fluid transfer device according to claim 5, said handgrip means comprising a rotary crossbar, and said holding means comprising an internal projection fixed to said casing for retaining engagement with said crossbar when the latter is rotated into alignment with said projection.

7. A fluid transfer device according to claim 1, said discharge means including a fluid connector connected to said one casing wall in fluid communication from said filling means through said fluid ports with the interior of said container, and a discharge conduit connected in fluid communication with said connector between said closure means and said one casing wall.

8. A fluid transfer device according to claim 7, said connector comprising a tube having one end connected in fluid communication with said one wall fluid port and extending outwardly therefrom to said filling means and said discharge conduit being connected to an intermediate region of said tube.

9. A fluid transfer device according to claim 8, in combination with a skirt on said flaring section detachably secured to said casing.

10. A fluid transfer device according to claim 9, said skirt extending about and in threaded engagement with said casing.

* * * * *